United States Patent
Pan et al.

(10) Patent No.: US 8,305,093 B2
(45) Date of Patent: Nov. 6, 2012

(54) TOUCH DEVICE AND CONTROL METHOD

(75) Inventors: Hsuan-Lin Pan, Miao-Li County (TW); Po-Sheng Shih, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 333 days.

(21) Appl. No.: 12/826,598

(22) Filed: Jun. 29, 2010

(65) Prior Publication Data

US 2011/0025352 A1 Feb. 3, 2011

(51) Int. Cl.
G01R 27/26 (2006.01)
G01R 27/08 (2006.01)

(52) U.S. Cl. .................. 324/686; 324/600; 324/691

(58) Field of Classification Search .............. None
See application file for complete search history.

(56) References Cited

U.S. PATENT DOCUMENTS

| | | | |
|---|---|---|---|
| 5,181,030 A * | 1/1993 | Itaya et al. | 341/20 |
| 6,088,024 A * | 7/2000 | Yamagata | 345/173 |
| 6,380,497 B1 * | 4/2002 | Hashimoto et al. | 200/5 A |
| 7,348,966 B2 * | 3/2008 | Hong et al. | 345/173 |
| 2005/0209392 A1 | 9/2005 | Luo et al. | |

* cited by examiner

*Primary Examiner* — Vinh Nguyen
(74) *Attorney, Agent, or Firm* — WPAT PC; Justin King

(57) ABSTRACT

A touch device includes a first conductive film, a plurality of first electrodes, a first auxiliary electrode, a plurality of second electrodes, a second auxiliary electrode, and a second conductive film. The first conductive film has a first side, a second side, a first area, and a second area. The first electrodes are disposed at the portion of the first side located at a side of the first area. The first auxiliary electrode is disposed at the portion of the first side located at a side of the second area. The second electrodes are disposed at the portion of the second side located at another side of the second area. The second auxiliary electrode is disposed at the portion of the second side located at another side of the first area. The second conductive film is disposed beside the first conductive film.

12 Claims, 5 Drawing Sheets

TOUCH DEVICE AND CONTROL METHOD

BACKGROUND

1. Technical Field

The disclosure generally relates to a sensing device and the control method thereof, and more particularly, to a touch device and a control method adapted thereto.

2. Description of Related Art

A typical resistive touch panel mainly includes a first conductive layer, a second conductive layer, and a plurality of spacers. The spacers are disposed between the first conductive layer and the second conductive layer for separating the first conductive layer from the second conductive layer, so as to prevent wrong action caused by a short circuit when the panel is not touched. Different coordinates along different axes corresponding to the position of a touched point are respectively sensed by the first conductive layer and the second conductive layer. For example, the position in an x-direction is sensed by the first conductive layer, and the position in a y-direction is sensed by the second conductive layer, where the x-direction is perpendicular to the y-direction.

When an operation is performed on the touch panel, different voltages are respectively applied to the first conductive layer and the second conductive layer. When a user touches the touch panel, an area of the first conductive layer corresponding to the touched position is in contact with an area of the second conductive layer corresponding to the touched position, such that the voltages of the first conductive layer and the second conductive layer are varied. The touch position in the x-direction is got by sensing the variation of voltage of the first conductive layer, and the touch position in the y-direction is obtained by sensing the variation of voltage of the second conductive layer.

For sensing the variation of voltage of the first conductive layer, there is a plurality of first electrodes disposed on a first side of the first conductive layer. Besides, for sensing the variation of voltage of the second conductive layer, there is a plurality of second electrodes disposed on a second side of the second conductive layer. The first side is perpendicular to the second side. The first electrodes and the second electrodes are connected to a drive integrated circuit (IC) respectively through a plurality of conductive wires. However, since the first electrodes are disposed on a same edge of the first conductive layer, and since the second electrodes are disposed on a same edge of the second conductive layer, a large space on a single edge in the peripheral area of the touch panel is needed to disposing these wires, which leads the single edge in the peripheral area of the touch panel to be too wide. As such, the appearance is not beautiful when the touch panel is disposed on the display, and the adaptability of the touch panel for different displays is limited.

SUMMARY

An embodiment of the disclosure provides a touch device including a first conductive film, a plurality of first electrodes, a first auxiliary electrode, a plurality of second electrodes, a second auxiliary electrode, and a second conductive film. The first conductive film has a first side, a second side opposite to the first side, a first area connecting the first side and the second side, a second area connecting the first side and the second side, and the first area is adjacent to the second area. The first electrodes are separated from each other by a determined interval, disposed at a portion of the first side located at a side of the first area, and electrically connected to the first area. The first auxiliary electrode is disposed at another portion of the first side located at a side of the second area and electrically connected to the second area. The first auxiliary electrode is adjacent to the first electrodes and keeps distance from the first electrodes. The second electrodes are separated from each other by another determined interval, disposed at a portion of the second side located at another side of the second area and electrically connected to the second area. The second auxiliary electrode is disposed at another portion of the second side located at another side of the first area and electrically connected to the first area. The second auxiliary electrode is adjacent to the second electrodes and keeps distance from the second electrodes. The second conductive film is disposed beside the first conductive film. When the touch device is not pressed, the first conductive film keeps distance away from the second conductive film. When the touch device is pressed, a pressed position of the first conductive film is in contact with the second conductive film.

Another embodiment of the disclosure provides a control method adapted to control the above touch device. The control method includes following steps. One of the first electrodes, the first auxiliary electrode, the second electrodes, and the second auxiliary electrode is controlled to be in a reading state one by one in turn, and a first reference voltage is applied to at least a part of the others of the first electrodes, the first auxiliary electrode, the second electrodes, and the second auxiliary electrode, and a second reference voltage is applied to the second conductive film. Voltage is at least not applied to the second auxiliary electrode when one of the first electrodes closest to the second area is in the reading state. Voltage is at least not applied to one of the second electrodes closest to the first area when the first auxiliary electrode is in the reading state. Voltage is at least not applied to the first auxiliary electrode when the one of the second electrodes closest to the first area is in the reading state. Voltage is at least not applied to the one of the first electrodes closest to the second area when the second auxiliary electrode is in the reading state.

In order to make the aforementioned and other features and advantages of the disclosure more comprehensible, embodiments accompanying figures are described in detail below.

BRIEF DESCRIPTION OF THE DRAWINGS

The accompanying drawings are included to provide a further understanding of the disclosure and are incorporated in and constitute a part of this specification. The drawings illustrate embodiments of the disclosure and, together with the description, serve to explain the principles of the disclosure.

DETAILED DESCRIPTION

First Embodiment

Figure 1A:
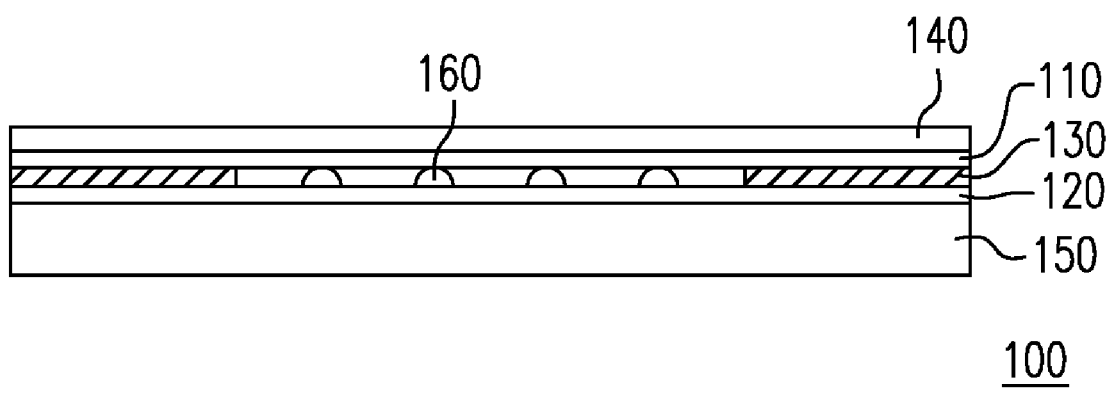
FIG. 1A is a schematic cross-sectional view of a touch device according to the first embodiment of the disclosure.

FIG. 1A is a schematic cross-sectional view of a touch device according to the first embodiment of the disclosure.

Figure 1B:
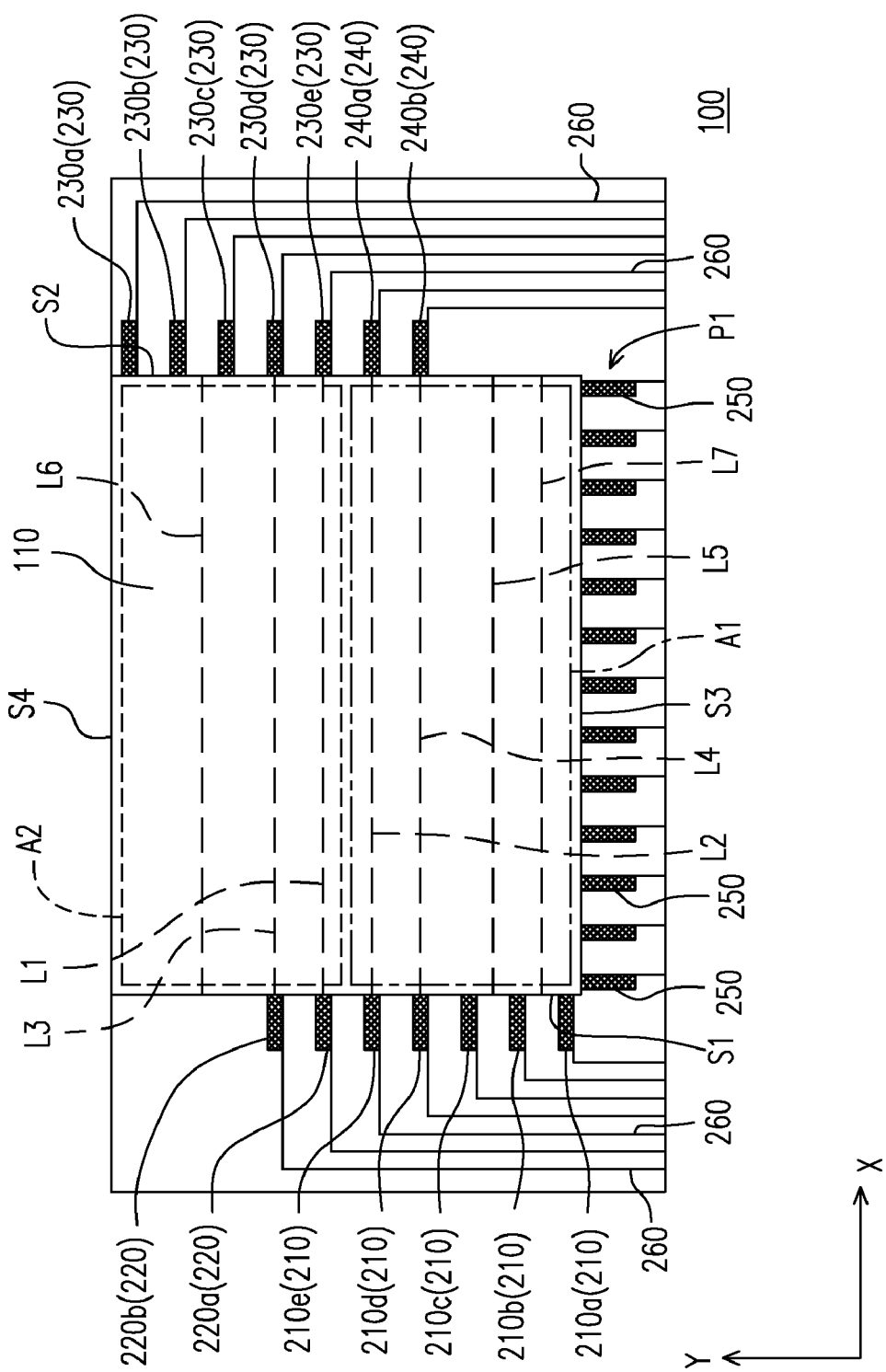
FIG. 1B is a schematic top view of the conductive film, the electrodes, and the conductive wires of the touch device in FIG. 1A.
Figure 1C:
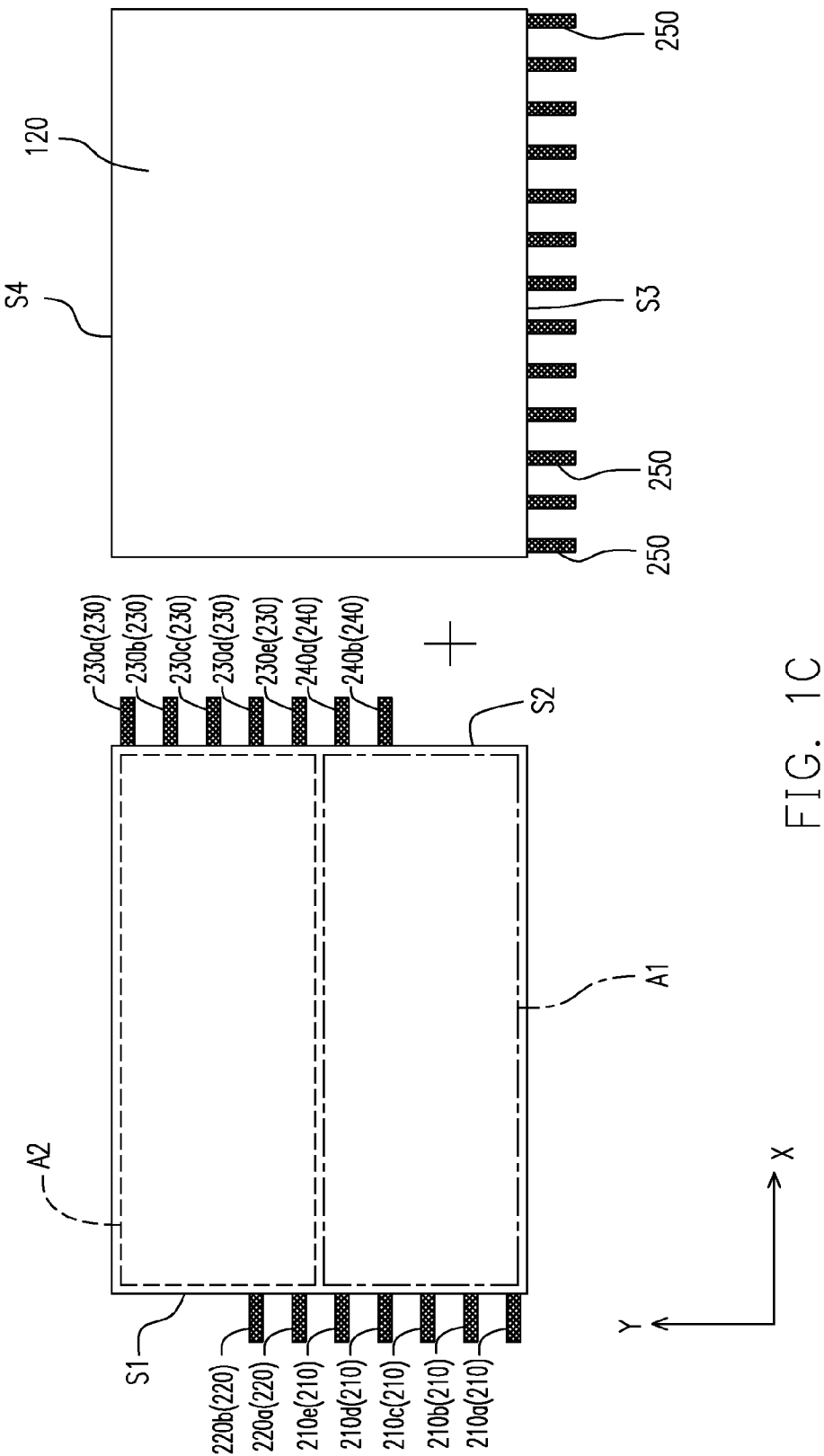
FIG. 1C is a parts breakdown view of the first conductive film, the electrodes electrically connected to the first conductive film, the second conductive film, and the electrodes electrically connected to the second conductive film of the touch device in FIG. 1A.

FIG. 1B is a top view of the conductive film, the electrodes, and the conductive wires of the touch device in FIG. 1A. FIG. 1C is a parts breakdown view of the first conductive film, the electrodes electrically connected to the first conductive film, the second conductive film, and the electrodes electrically connected to the second conductive film of the touch device in FIG. 1A. Referring to FIGS. 1A through 1C, the touch device 100 according to this embodiment includes a first substrate 140 and a second substrate 150 opposite to the first substrate 140. The first substrate 140 is, for example, made of elastic material, and the second substrate 150 is, for example, made of rigid material for bearing a certain pressure. In this embodiment, the first substrate 140 is, for example, a polyester film, and the second substrate 150 is, for example, a glass substrate.

A first conductive film 110 (i.e. an electrically conductive film) is disposed on the surface of the first substrate 140 facing the second substrate 150, and a second conductive film 120 (i.e. an electrical conductive film) is disposed on the surface of the second substrate 150 facing the first substrate 140. In other words, the first conductive film 110 is disposed beside the second conductive film 120. In this embodiment, the touch device 100 further includes an adhesive layer 130 disposed between the first conductive film 110 and the second conductive film 120 and at the edges of the first conductive film 110 and the second conductive film 120, so as to bind the first substrate 140 on which the first conductive film 110 is disposed and the second substrate 150 on which the second conductive film 120 is disposed.

When the touch device 100 is not pressed (i.e. the first substrate 140 is not pressed in this embodiment), the first conductive film 110 is separated away and is electrically insulated from the second conductive film 120. In this embodiment, interval of separation between the first conductive film 110 and the second conductive film 120 is, for example, about 2 to 10 microns. In addition, in this embodiment, there is a plurality of spacers 160 dispersedly disposed between the first conductive film 110 and the second conductive film 120. The spacers 160 have insulating and supporting functions, such that the first conductive film 110 and the second conductive film 120 keep separate from each other when the touch device 100 is not pressed. However, when the size of the touch device 100 is small, the spacers 160 may not be used, which may still assures that the first conductive film 110 is electrically insulated from the second conductive film 120 when the touch device 100 is not pressed. When the touch device 100 is pressed (i.e. the first substrate 140 is pressed in this embodiment), the pressed position of the first conductive film 110 is in contact with the pressed position of the second conductive film 120.

The touch device 100 of this embodiment further includes a plurality of first electrodes 210, a plurality of auxiliary electrodes 220, a plurality of second electrodes 230, and a plurality of auxiliary electrodes 240. The first conductive film 110 has a first side S1, a second side S2 opposite to the first side S1, a first area A1 connecting the first side S1 and the second side S2, and a second area A2 connecting the first side S1 and the second side S2. The first area A1 is adjacent to the second area A2. The first electrodes 210 are separated from each other by a determined interval and disposed at a portion of the first side S1 located at a side of the first area A1. Moreover, the first electrodes 210 are electrically connected to the first area A1. In this embodiment, the first side S1 is substantially parallel to the y-direction in the figure and substantially perpendicular to the x-direction in the figure, and the x-direction is perpendicular to the y-direction.

The auxiliary electrodes 220 are disposed at another portion of the first side S1 located at a side of the second area A2, and the auxiliary electrodes 220 are electrically connected to the second area A2. In this embodiment, the auxiliary electrodes 220 include a first auxiliary electrode 220a and a third auxiliary electrode 220b. The first auxiliary electrode 220a is adjacent to the first area A1. The first auxiliary electrode 220a is adjacent to the first electrodes 210 and keeps distance from the first electrodes 210. The third auxiliary electrode 220b is adjacent to the first auxiliary electrode 220a and keeps distance from the first auxiliary electrode 220a. The third auxiliary electrode 220b is adjacent to the first area A1. The first auxiliary electrode 220a is disposed between the third auxiliary electrode 220b and the first electrode 210.

The second electrodes 230 are separated from each other by another determined interval and disposed at a portion of the second side S2 located at another side of the second area A2. The second electrodes 230 are electrically connected to the second area A2. The auxiliary electrodes 240 are disposed at another portion of the second side S2 located at another side of the first area A1, and the auxiliary electrodes 240 are electrically connected to the first area A1. In this embodiment, the auxiliary electrodes 240 include a second auxiliary electrode 240a and a fourth auxiliary electrode 240b. The second auxiliary electrode 240a is adjacent to the second area A2. Moreover, the second auxiliary electrode 240a is adjacent to the second electrode 230 and keeps distance from the second electrodes 230. The fourth auxiliary electrode 240b is adjacent to the second auxiliary electrode 240a and keeps distance from the second auxiliary electrode 240a. The fourth auxiliary electrode 240b is adjacent to the second area A2. The second auxiliary electrode 240a is disposed between the fourth auxiliary electrode 240b and the second electrode 230.

In this embodiment, the first electrodes 210 and the auxiliary electrodes 220 may be arranged at equal intervals, and the second electrodes 230 and the auxiliary electrodes 240 may be arranged at equal intervals, but the disclosure is not limited thereto. In addition, in this embodiment, the one of the second electrodes 230 closest to the first area A1 (i.e. the second electrode 230e in this embodiment) and the first auxiliary electrode 220a are arranged in a first reference line L1 correspondingly. The one of the second electrodes 230 second closest to the first area A1 (i.e. the second electrode 230d in this embodiment) and the third auxiliary electrode 220b are arranged in a third reference line L3 correspondingly. The one of the first electrodes 210 closest to the second area A2 (i.e. the first electrode 210e in this embodiment) and the second auxiliary electrode 240a are arranged in a second reference line L2 correspondingly. The one of the first electrodes 210 second closest to the second area A2 (i.e. the first electrode 210d in this embodiment) and the fourth auxiliary electrode 240b are arranged in a fourth reference line L4 correspondingly. Moreover, the first reference line L1, the second reference line L2, the third reference line L3, and the fourth reference line L4 are substantially parallel to one another, and the first reference line L1 is substantially perpendicular to the first side S1 and the second side S2. The first electrodes 210, the second electrodes 230, the auxiliary electrodes 220, and the auxiliary electrodes 240 are used to determine the position of the pressed point (i.e. the touched point) in the y-direction.

In this embodiment, the touch device 100 further includes a plurality of third electrodes 250 disposed at a third side S3 of the second conductive film 120 and electrically connected to the second conductive film 120. An end of the third side S3 is adjacent to an end of the first side S1, and the other end of the third side S3 is adjacent to an end of the second side S2. The third side S3 may be substantially parallel to the x-direction. Besides, in this embodiment, the third electrodes 250 are, for example, arranged in equal intervals, but the disclosure is not limited thereto. The third electrodes 250 are used to determine the position of the pressed point (i.e. the touched point) in the x-direction.

Each of the first conductive film 110 and the second conductive film 120 is, for example, a conductive film having anisotropic impedance. Specifically, each of the first conductive film 110 and the second conductive film 120 is, for example, a carbon nanotube (CNT) film. In this embodiment, the CNT film is a transparent conductive film. In addition, in this embodiment, the main conductive direction of the first conductive film 110 is substantially perpendicular to the first side S1 and the second side S2, i.e. substantially parallel to the first reference line L1 in this embodiment. The main conductive direction of the second conductive film 120 is substantially perpendicular to the third side S3, i.e. substantially perpendicular to the first reference line L1 in this embodiment. The main conductive direction of the first conductive film 110 (i.e. the x-direction in this embodiment) is substantially perpendicular to the main conductive direction of the second conductive film 120 (i.e. the y-direction in this embodiment).

In the touch device 100 according to this embodiment, since the first electrodes 210 and the second electrodes 230 electrically connected to the first conductive film 110 are respectively disposed at two opposite sides of the first conductive film 110 (i.e. the first side S1 and the second side S2), the conductive wires 260 connected to the first electrodes 210, the auxiliary electrodes 220, the second electrodes 230, and the auxiliary electrodes 240 are distributed at two opposite edges in the peripheral area P1 of the touch device 100. Therefore, the problem of a single edge in the peripheral area of the conventional touch panel being too wide is effectively resulted. As a result, the touch device 100 according to this embodiment has more beautiful appearance when it is disposed on a display (not shown), and has better adaptability for different kinds of displays. Additionally, when the position of the pressed point (i.e. the touched point) is located between the first reference line L1 and the second reference line L2, the design of the auxiliary electrodes 220 improves the accuracy of determining the position of the touched point.

It should be noted that the third electrodes 250 are not limited to be disposed at the same side of the second conductive film 120 (i.e. the third side S3). In other embodiments, depending on the requirement of the user, a part of the third electrodes 250 may be disposed at a fourth side S4 of the second conductive film 120. The fourth side S4 is opposite to the third side S3. The other part of the third electrodes 250 may be disposed at the third side S3 of the second conductive film 120, which is similar to that the first electrodes 210 and the second electrodes 230 are disposed at two opposite sides of the first conductive film 110. Moreover, there may be auxiliary electrodes disposed at the third side S3 and the fourth side S4. Besides, the number of the third auxiliary electrode 220b is not limited to one and the number of the fourth auxiliary electrode 240b is not limited to one in the disclosure. In other embodiments, the number of the third auxiliary electrodes 220b may be plural, and the number of the fourth auxiliary electrodes 240b may be plural. The third auxiliary electrodes 220b are separated from each other, and the fourth auxiliary electrodes 240b are separated from each other.

Second Embodiment

Figure 2:
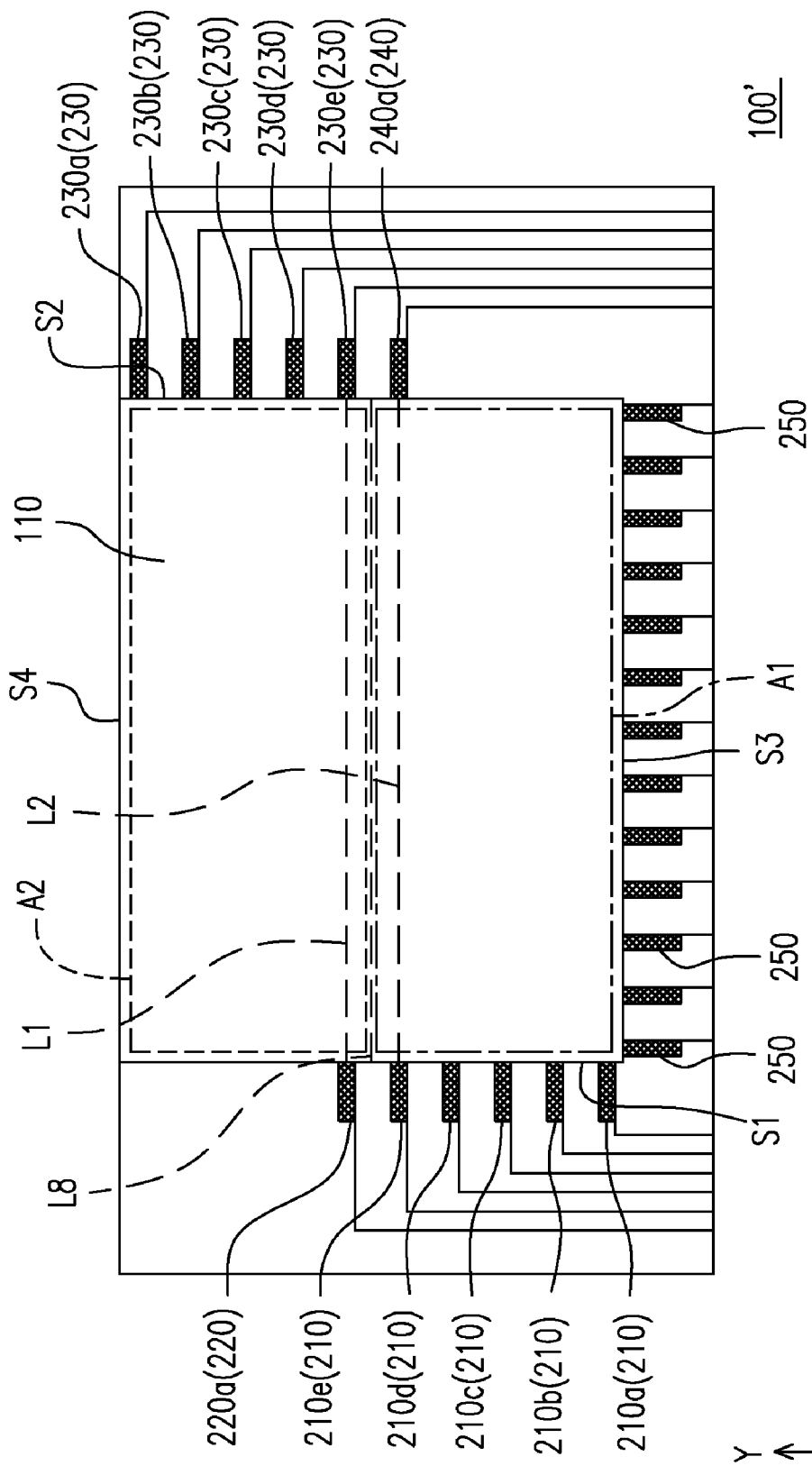
FIG. 2 is a schematic top view of the conductive film, the electrodes, and the conductive wires of a touch device in the second embodiment of the disclosure.

FIG. 2 is a schematic top view of the conductive film, the electrodes, and the conductive wires of a touch device in the second embodiment of the disclosure. Referring to FIG. 2, the touch device 100' of this embodiment is similar to the touch device 100 in FIG. 1B, and the main difference therebetween lies in that the touch device 100' of this embodiment has the first auxiliary electrode 220a and the second auxiliary electrode 240a, but does not have the third auxiliary electrode 220b and the fourth auxiliary electrode 240b in FIG. 1B. In other words, in this embodiment, there is only one auxiliary electrode 220 at the first side S1, and there is only one auxiliary electrode 240 at the second side S2.

Third Embodiment

Figure 3:
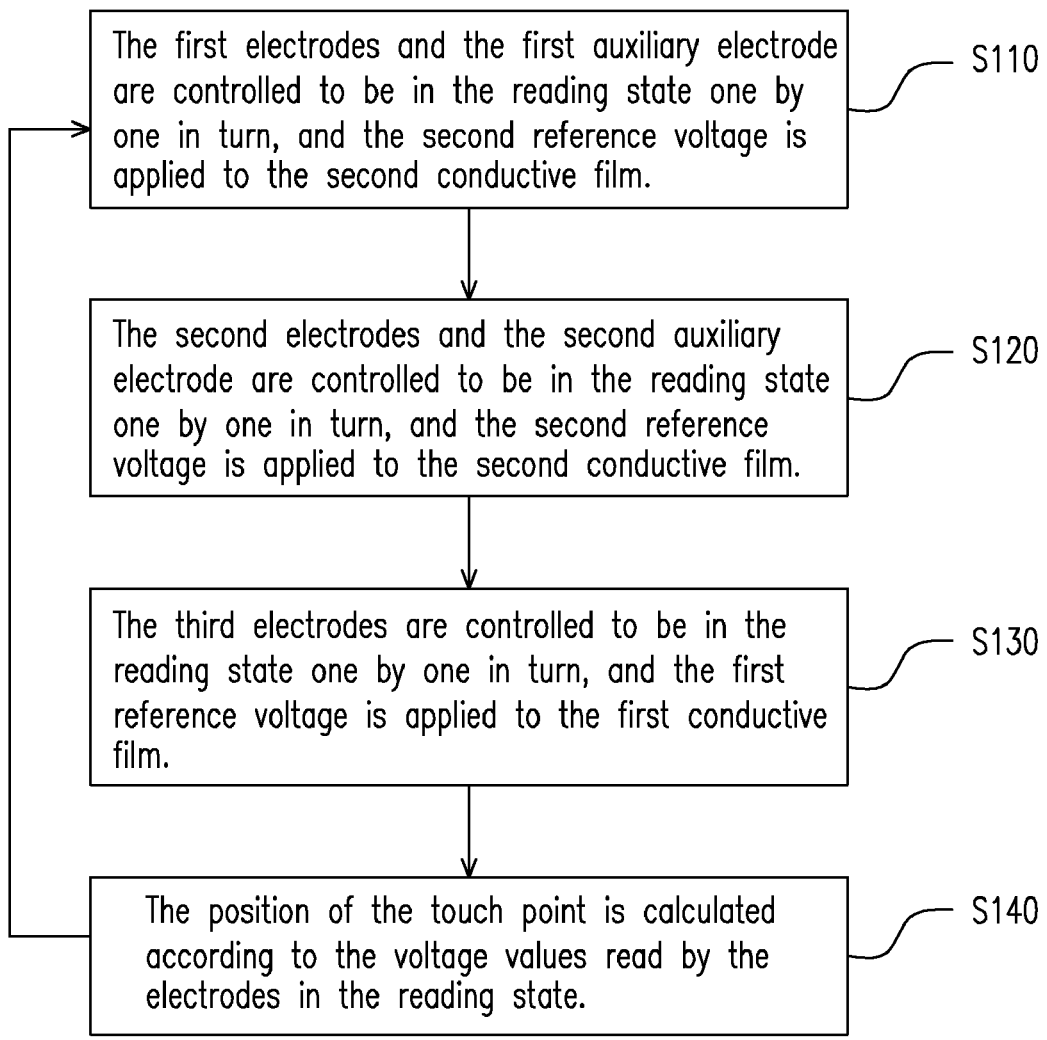
FIG. 3 is a flow chart of the control method according to the third embodiment of the disclosure.

FIG. 3 is a flowchart of the control method according to the third embodiment of the disclosure. Referring to FIG. 1A, FIG. 1B, and FIG. 3, the control method according to this embodiment is adapted to control the touch device 100 of the above embodiment. The control method includes following steps. First, a step S110 is executed, where the first electrodes 210 and the first auxiliary electrode 220a are controlled to be in a reading state one by one in turn, and where a second reference voltage is applied to the second conductive film 120. In this embodiment, the first electrodes 210, the auxiliary electrodes 220, the second electrodes 230, and the auxiliary electrodes 240 are electrically connected to a drive circuit (not shown) through a plurality of conductive wires 260, and the drive circuit is, for example, a drive integrated circuit (IC). In this embodiment, the drive circuit is adapted to switch the electrodes to two different states, i.e. a driving state and the reading state. In the driving state, the drive circuit applies a first reference voltage to the electrode connected thereto. In the reading state, the drive circuit switches the electrode to a floating state or a high impedance state, while the circuit does not apply voltage to the electrode connected thereto and is adapted to read the voltage of the electrode connected thereto.

In this embodiment, controlling the first electrodes 210 and the first auxiliary electrode 220a to be in a reading state one by one in turn may be controlling the first electrodes 210a to 210e and the first auxiliary electrode 220a to be in the reading state one by one in sequence. In addition, applying the second reference voltage to the second conductive film 120 may be achieved by applying the second reference voltage to the third electrodes 250.

When any one of the first electrodes 210 and the first auxiliary electrode 220a is in the reading state, the first reference voltage is applied to the others of the first electrodes 210 and the first auxiliary electrode 220a. In this embodiment, the first reference voltage is also applied to the third auxiliary electrode 220b meanwhile. For example, when the first electrode 210c is in the reading state, a first reference voltage is applied to the first electrodes 210a-210b and 210d-210e, the first auxiliary electrode 220a, and the third auxiliary electrode 220b. However, in other embodiments, when any one of the first electrodes 210 and the first auxiliary electrode 220a is in the reading state, the first reference voltage may just applied to a part of the others of the first electrodes 210 and the first auxiliary electrode 220a, for example, the first reference voltage is applied to the electrodes near the electrode which is in the reading state. In addition, the first reference voltage is not equal to the second reference. In this embodiment, the first reference voltage is, for example, 0 volts, and the second reference voltage is, for example 5 volts, but the disclosure is not limited thereto.

When the one of the first electrodes 210 closest to the second area A2 (i.e. the first electrode 210e in this embodiment) is in the reading state, voltage is at least not applied to the second auxiliary electrode 240a. For example, the second auxiliary electrode 240a is in the reading state. That is to say, at this time, for increasing the accuracy of the voltage value read by the first electrode 210e, the second auxiliary electrode 240a opposite to the first electrode 210e may be in the floating state or in the high impedance state but not in the driving state, which prevents the voltage value read by the first electrode 210e from being disturbed by the second auxiliary electrode 240a. At this time, the auxiliary electrode 240a being in the reading state is not for reading a voltage value, but for being in the floating state or in the high impedance state such that voltage is not applied to the second auxiliary electrode 240a. As a result, the drive circuit may not read the voltage of the second auxiliary electrode 240a at this time. Alternatively, even if the drive circuit reads the voltage of the second auxiliary electrode 240a, this voltage is not adopted.

By the same token, when the first auxiliary electrode 220a is in the reading state, voltage is at least not applied to the one of the second electrodes 230 closest to the first area A1 (i.e. the second electrode 230e in this embodiment) when the first auxiliary electrode 220a is in the reading state; that is, the second electrode 230e is in the reading state, for example. At this time, the drive circuit reads the voltage value of the first auxiliary electrode 220a, but does not read the voltage value of the second electrode 230e. Alternatively, even if the drive circuit reads the voltage value of the second electrode 230e, this voltage value is not adopted.

By the same token, in this embodiment, when the one of the first electrodes 210 second closest to the second area A2 (i.e. the first electrode 210d) is in the reading state, voltage is at least not applied to the fourth auxiliary electrode 240b; for example, the fourth auxiliary electrode 240b is in the reading state. At this time, the drive circuit reads the voltage value of the first electrode 120d, but does not read the voltage value of the fourth auxiliary electrode 240b. Alternatively, even if the drive circuit reads the voltage value of the fourth auxiliary electrode 240b, this voltage value is not adopted.

When any one of the first electrodes 210b to 210d is in the reading state, the electrodes at the two opposite sides thereof are in the driving state. In order to make the first auxiliary electrode 220a be in the same environment, in this embodiment, the first voltage is applied to the third auxiliary electrode 220b when the first auxiliary electrode 220a is in the reading state. To further improve the consistency of the reading environment, in this embodiment, the first reference voltage may be applied to the third auxiliary electrode 220b when any one of the first electrodes 210 is in the reading state.

Next, a step S120 is executed. The step S120 is similar to the step S110, and the main difference therebetween lies in that the electrodes being controlled are different. However, the effect achieved by the step S120 is the same as that achieved by the step S110, and the details can be referred to the description of the step S110. The step S120 is controlling the second electrodes 230 and the second auxiliary electrode 240a to be in the reading state one by one in turn, for example, controlling the second electrodes 230a to 230e and the second auxiliary electrode 240a to be in the reading state one by one in sequence, and applying the second reference voltage to the second conductive film 120. When any one of the second electrodes 230 and the second auxiliary electrode 240a is in the reading state, the first reference voltage is applied to at least a part of the others of the second electrodes 230 and the second auxiliary electrode 240a. When the one of the second electrodes 230 closest to the first area A1 is in the reading state, voltage is at least not applied to the first auxiliary electrode 240a, for example, the first auxiliary electrode 240a is in the reading state. When the second auxiliary electrode 240a is in the reading state, voltage is at least not applied to the one of the first electrodes 210 closest to the second area A2, for example, the one of the first electrodes 210 closest to the second area A2 is, for example, in the reading state.

By the same token, in this embodiment, when the one of the second electrodes 230 second closest to the first area A1 (i.e. the second electrode 230d) is in the reading state, voltage is at least not applied to the third auxiliary electrode 220b; for example, the third auxiliary electrode 220b is in the reading state. At this time, the drive circuit reads the voltage value of the second electrode 230d, but does not read the voltage value of the third auxiliary electrode 220b. Alternatively, even if the drive circuit reads the voltage value of the third auxiliary electrode 220b, this voltage value is not adopted.

Besides, in this embodiment, when the second auxiliary electrode 240a is in the reading state, the first reference voltage is applied to the fourth auxiliary electrode 240b, such that the reading environment of the second auxiliary electrode 240a is similar to that of other electrodes.

To further improve the consistency of the reading environment, in this embodiment, the first reference voltage may be applied to the fourth auxiliary electrode 240b when any one of the second electrodes 230 is in the reading state.

It should be noted that the disclosure is not limited to execute the step S110 first and then execute the step S120. In other embodiments, the step S110 may be executed after the step S120. Alternatively, the reading steps included by the step S110 and the reading steps included by the step S120 may be executed in any possible sequences. For example, the reading steps included by the step S110 and the reading steps included by the step S120 may be executed alternately.

In this embodiment, a step S130 may be executed afterward. The step S130 is controlling the third electrodes 250 to be in the reading state one by one in turn, and applying the first reference voltage to the first conductive film 110. In this embodiment, applying the first reference voltage to the first conductive film 110 is, for example, that the drive circuit applies the first reference voltage to the first electrode 210, the auxiliary electrodes 220, the second electrode 230, and the auxiliary electrodes 240. When any one of the third electrodes 250 is in the reading state, the second reference voltage is applied to the others of the third electrodes 250. In other embodiments, the second reference voltage may be applied to a part of the others of the third electrodes 250, fox example, applied to the electrodes near the one of the third electrodes 250 in the reading state.

In this embodiment, a step S140 may be executed after. The step S140 is calculating the position of the pressed point (i.e. the touched point) according to the voltage values read by the above-mentioned electrodes, for example, the first electrodes 210, the first auxiliary electrode 220a, the second electrodes 230, the second auxiliary electrode 240a, and the third electrodes 250. Specifically, when the touch device 100 is pressed, the voltage values respectively sensed by the first electrodes 210 and the second electrodes 230 include an extreme value. In this embodiment, since the first reference voltage is less than the second reference voltage, the extreme value is a maximum greater than the first reference voltage. The control method of this embodiment further includes calculating the position of the pressed position (i.e. the touched position) of the touch device along a direction substantially parallel to the first side S1 (i.e. the y-direction) according to this extreme value and two voltage values respectively sensed by two electrodes adjacent to the electrode sensing this extreme value.

In addition, the voltage values respectively sensed by the third electrodes 250 in the reading state include an extreme value. In this embodiment, since the first reference voltage is less than the second reference voltage, the extreme value is a minimum less than the second reference voltage. The control method of this embodiment further includes calculating the position of the pressed position (i.e. the touched position) of the touch device along a direction substantially parallel to the third side S3 (i.e. the x-direction) according to this minimum and two voltage values respectively sensed by two electrodes adjacent to the electrode sensing this minimum.

The details of the calculating method are as follows:

The voltage signals sensed by the first electrodes 210, the second electrodes 230, the first auxiliary electrode 220a, and the second auxiliary electrode 240a include an extreme voltage signal, a first voltage signal, and a second voltage signal. The extreme voltage signal is the maximum of the three voltage signals, and the electrodes reading the three voltage signals are herein called the first sensing electrode, the second sensing electrode, and the third sensing electrode, respectively. The first voltage signal is got by the first sensing electrode, the extreme signal is got by the second sensing electrode, and the second voltage signal is got by the third sensing electrode. The second sensing electrode is between the first sensing electrode and the third sensing electrode, and the second sensing electrode is respectively adjacent to the first sensing electrode and the third sensing electrode. The first sensing electrode, the second sensing electrode, and the third sensing electrode are arranged along the y-direction in sequence.

Every two adjacent ones of the sensing electrodes are separated from each other. The position of the touched point along the y-direction of the calculating method includes a plurality of operation parameters, and the operation parameters include the difference between the extreme voltage signal and the first voltage signal, the difference between the extreme voltage signal and the second voltage signal, and the above interval. The calculating method includes three equations as follows:

$$\Delta 1 > \Delta 2 \Rightarrow \Delta S = 0.5 P_y \times \frac{\Delta 1 - \Delta 2}{\Delta 1}$$

$$\Delta 1 = \Delta 2 \Rightarrow \Delta S = 0$$

$$\Delta 1 < \Delta 2 \Rightarrow \Delta S = 0.5 P_y \times \frac{\Delta 1 - \Delta 2}{\Delta 2}$$

where 1 is the difference of the extreme voltage signal minus the first voltage signal; 2 is the difference of the extreme voltage signal minus the second voltage signal; Py is the above interval; S is the difference of the calculated position of the touched point along the y-direction minus the position of the second sensing electrode along the y-direction. As such, after S is calculated by the above equations, the position of the touched point along the y-direction is calculated by adding S to the position of the second sensing electrode along the y-direction. The position of the touched point in the x-direction may be calculated by a similar method to that described hereinbefore, which is not repeated herein. The above calculating method and the above equations are called three point interpolation and three point interpolation equations.

The method for calculating the position of the touched point along the y-direction is adapted to the case that the touched point is located between the fifth reference line L5 and the sixth reference line L6, and the fifth reference line L5 and the sixth reference line L6 are substantially parallel to the first reference line L1. The fifth reference line L5 is the midline between the first electrodes 210b and 210c, and the sixth reference line L6 is the midline between the second electrodes 230b and 230c. However, when the touched point is located below the fifth reference line L5 in the figure or above the sixth reference line L6 in the figure, there is no electrode providing the first reference voltage below the first electrode 210a or above the second electrode 230a, such that the above second voltage signal may be modified by an edge modifying method of the three point interpolation first, and then substituted into the above three point interpolation equations, but the second voltage signal is not directly substituted into the three point interpolation equations.

The touched point located below the fifth reference line L5 in FIG. 1B is taken as an example for interpretation. The case that the touched point is located above the sixth reference line L6 may be dealt with by the same principle, which is not repeated hereinafter.

If the touched point is below the fifth reference line L5, the first electrode 210a is deemed the first sensing electrode, the first electrode 210b is deemed the second sensing electrode, and the first electrode 210c is deemed the third sensing electrode. The modifying method of the three point interpolation has the relationship established according to the first reference voltage, a third voltage signal, and a fourth voltage signal, and the method for calculating the third voltage signal and the fourth voltage signal is as follows:

The midline between the first electrode 210a and the first electrode 210b is defined as a seventh reference line L7 which substantially parallel to the first reference line L1.

When the seventh reference line L7 is pressed to change the first reference voltage on the seventh reference line L7, the third voltage signal is got by the first sensing electrode, and the fourth voltage signal is got by the second sensing electrode. In addition, the distance between the third side S3 and the position where the first reference voltage on the seventh reference line L7 is changed is equal to the distance between the third side S3 and the touched point.

The edge modifying method of the three point interpolation may be represented by a edge modifying equation of the three point interpolation as follows:

$$V4 = Vr - (Vr - V3) \times (Vr - V2)/(Vr - V1)$$

where V1 is the third voltage signal, V2 is the fourth voltage signal, V3 is the first voltage signal, V4 is a modified voltage signal, and Vr is the first reference voltage.

Accordingly, when the touched position along the y-direction is located below the fifth reference line L5, the first voltage signal got by the first sensing electrode is modified by the edge modifying method of the three point interpolation to get the modified voltage signal first, and the second voltage signal, the extreme voltage signal, and the modified voltage signal are substituted into the three point interpolation equations, and then the position of the touched point in the y-direction is calculated. At this time, 2 in the tree equations of the three point interpolation is the difference of the extreme voltage signal minus the modified voltage signal.

The edge modifying method of the tree point interpolation may also adapt to the third electrodes 250, and is not repeated herein.

Besides, when the touched point is located below the seventh reference line L7 in FIG. 1B or in the region above the midline between the second electrode 230a and the second electrode 230b, the coordinate of the touched point in the y-direction may be calculated by an edge modifying method of two point interpolation as follows.

For example, when the touched point is below the seventh reference line L7, the electrode closest to the origin in the y-direction is the first electrode 210a, and the electrode second closest to the origin is the first electrode 210b. When V₁ is the maximum voltage, the position Yt of the touched point satisfies the edge modification equation of the two point interpolation:

$$Yt = Y1 + 0.5P_y - 0.5P_y \times \frac{V_2 - V_1}{Vr - V_1}$$

where $Y_r$ is the first reference voltage; $V_1$ the voltage sensed by the first electrode 210a; $V_2$ is the voltage sensed by the first electrode 210b; $P_y$ is the interval between the first electrode 210a and the first electrode 210b; Y1 is the position of the first electrode 210a in the y-direction, wherein $V_r > V_2 > V_1$. As such, when the touched point is located below the seventh reference line L7, the position of the touched point in the y-direction may be calculated more precisely.

The edge modifying method of the two point interpolation may also adapt to the third electrodes 250, and is not repeated herein.

It should be noted that, when the touched point is located between the first reference line L1 and the second reference line L2, since there is the third auxiliary electrode 220b above the first auxiliary electrode 220a to apply the first reference voltage when the first auxiliary electrode 220a is in the reading state, and since there is the fourth auxiliary electrode 240b below the second auxiliary electrode 240a to apply the first reference voltage when the second auxiliary electrode 240a is in the reading state, the edge modifying method of the three point interpolation or the edge modifying method of the two point interpolation may not be adopted. In other words, the accuracy of determining the position of the touched point is improved by applying the first reference voltage to the third auxiliary electrode 220b and the fourth auxiliary electrode 240b.

After that, the steps S110 to S140 may be repeated again and again, so as to achieve the effect of dynamically monitoring the change of the position of the touched point.

Based on the above, when the first electrodes 210 and the first auxiliary electrode 220a in the first side S1 are controlled to be in the reading state one by one in turn, voltage is not applied to the suitable electrodes at the second side S2 at a suitable time in the control method of this embodiment, such that the voltage environments of the electrodes at the first side S1 in the reading state are more similar or consistent. As such, the accuracy of determining the position of the pressed point, i.e. the touched point, of the touch device 100 and the control method according to this embodiment is improved. Moreover, when the second electrodes 230 and the second auxiliary electrode 240a at the second side S2 are controlled to be in the reading state one by one in turn, voltage is not applied to the suitable electrodes at the first side S1 at a suitable time in the control method according to this embodiment, which also achieves the above-mentioned effect.

Fourth Embodiment

Referring to FIG. 1A and FIG. 1B, the control method of this embodiment is similar to the control method of the third embodiment, and the main difference therebetween is as follows. In the control method of the third embodiment, when the electrode at the first side S1 has an opposite electrode at the second side S2, and when the electrode at the first side S1 is in the reading state, voltage is not applied to the opposite electrode at the second side S2, for example; the opposite electrode is in the reading state, and vice versa. However, for assuring the voltage environment when the electrode is in the reading state, in this embodiment, when the electrode at the first side S1 is in the reading state, voltage is also not applied to the opposite electrode and the obliquely opposite electrode at the second side S2, for example the opposite electrode and the obliquely opposite electrode are in the reading state. In addition, when the electrode at the first side S1 on or above the fourth reference line L4 is in the reading state, voltage is at least not applied to the electrodes at the second side S2 having the y-coordinates less than or equal to that of this electrode at the first side, for example, the electrodes at the second side S2 are in the reading state. On the contrary, when the electrode at the second side S2 on or below the third reference line L3 is in the reading state, voltage is at least not applied to the electrodes at the first side S1 having the y-coordinates greater than or equal to that of this electrode at the second side S2; for example, the electrodes at the first side S1 are in the reading state. The detailed description is given as follows.

In this embodiment, when the one of the first electrodes 210 third closest to the second area A2 (i.e. the first electrode 210c) is in the reading state, voltage is at least not applied to the fourth auxiliary electrode 240b; for example, the fourth auxiliary electrode 240b is in the reading state. When the one of the first electrodes 210 second closest to the second area A2 (i.e. the first electrode 210d) is in the reading state, voltage is at least not applied to the fourth auxiliary electrode 240b and the second auxiliary electrode 240a; for example, the fourth auxiliary electrode 240b and the second auxiliary electrode 240a are in the reading state. When the one of the first electrodes 210 closest to the second area A2 (i.e. the first electrode 210e) is in the reading state, voltage is at least not applied to the one of the second electrodes 230 closest to the first area A1 (i.e. the second electrode 230e), the fourth auxiliary electrode 240b, and the second auxiliary electrode 240a; for example, the second electrode 230e, the fourth auxiliary electrode 240b and the second auxiliary electrode 240a are in the reading state. When the first auxiliary electrode 220a is in the reading state, voltage is at least not applied to the two of the second electrodes 230 closest to the first area A1 (i.e. the second electrodes 230d and 230e), the fourth auxiliary electrode 240b and the second auxiliary electrode 240a; for example, the second electrodes 230d and 230e, the fourth auxiliary electrode 240b, and the second auxiliary electrode 240a are in the reading state. When the one of the second electrodes 230 third closest to the first area A1 (i.e. the second electrode 230c) is in the reading state, voltage is at least not applied to the third auxiliary electrode 220b; for example, the third auxiliary electrode 220b is in the reading state. When the one of the second electrodes 230 second closest to the first area A1 (i.e. the second electrode 230d) is in the reading state, voltage is at least not applied to the third auxiliary electrode 220b and the first auxiliary electrode 220a; for example, the third auxiliary electrode 220b and the first auxiliary electrode 220a are in the reading state. When the one of the second electrodes 230 closest to the first area A1 (i.e. the second electrode 230e) is in the reading state, voltage is at least not applied to the one of the first electrodes 210 closest to the second area A2 (i.e. the first electrode 210e), the third auxiliary electrode 220b, and the first auxiliary electrode 220a; for example, the first electrode 210e, the third auxiliary electrode 220b and the first auxiliary electrode 220a are in the reading state. When the second auxiliary electrode 240a is in the reading state, voltage is at least not applied to the two of the first electrodes 210 closest to the second area A2 (i.e. the first electrodes 210d and 210e), the third auxiliary electrode 220b, and the first auxiliary electrode 220a; for example, the first electrodes 210d and 210e, the third auxiliary electrode 220b, and the first auxiliary electrode 220a are in the reading state, for example.

Fifth Embodiment

Referring to FIG. 1A and FIG. 1B, the control method of this embodiment is similar to the control method of the fourth embodiment, and the main difference therebetween lies in that there are more obliquely opposite electrodes which is not applied voltage to, and the details are as follows.

In this embodiment, when any one electrode selected from the electrodes of the first electrodes 210 which are third to $N_7$th closest to the second area A2 is in the reading state, voltage is at least not applied to the fourth auxiliary electrode 240b; for example, the fourth auxiliary electrode 240b is in the reading state, and $N_7$ is a natural number greater than 3. When the one of the first electrodes 210 second closest to the second area A2 is in the reading state, voltage is at least not applied to the $N_8$ electrodes of the second electrodes 230 closest to the first area A1, the fourth auxiliary electrode 240b, and the second auxiliary electrode 240a; for example, the $N_8$ electrodes, the fourth auxiliary electrode 240b, and the second auxiliary electrode 240a are in the reading state, and $N_9$ is a natural number greater than 0. When the one of the first electrodes 210 closest to the second area A2 is in the reading state, voltage is at least not applied to the $N_9$ electrodes of the second electrodes 230 closest to the first area A1, the fourth auxiliary electrode 240b, and the second auxiliary electrode 240a; for example, the $N_9$ electrodes, the fourth auxiliary electrode 240b, and the second auxiliary electrode 240a are in the reading state, and $N_9$ is a natural number greater than 1. When the first auxiliary electrode 220a is in the reading state, voltage is at least not applied to the $N_{10}$ electrodes of the second electrodes 230 closest to the first area A1, the fourth auxiliary electrode 240b, and the second auxiliary electrode 240a; for example, the $N_{10}$ electrodes, the fourth auxiliary electrode 240b, and the second auxiliary electrode 240a are in the reading state, and $N_{10}$ is a natural number greater than 2. When any one electrode selected from the electrodes of the second electrodes 230 which are third to $N_{11}$th closest to the first area A1 is in the reading state, voltage is at least not applied to the third auxiliary electrode 220b; for example, the third auxiliary electrode 220b is in the reading state, and $N_{11}$ is a natural number greater than 3. When the one of the second electrodes 230 second closest to the first area A1 is in the reading state, voltage is at least not applied to the $N_{12}$ electrodes of the first electrodes 210 closest to the second area A2, the third auxiliary electrode 220b, and the first auxiliary electrode 220a; for example, the $N_{12}$ electrodes, the third auxiliary electrode 220b, and the first auxiliary electrode 220a are in the reading state, and $N_{12}$ is a natural number greater than 0. When the one of the second electrodes 230 closest to the first area A1 is in the reading state, voltage is at least not applied to the $N_{13}$ electrodes of the first electrodes 210 closest to the second area A2, the third auxiliary electrode 220b, and the first auxiliary electrode 220a; for example, the $N_{13}$ electrodes, the third auxiliary electrode 220b, and the first auxiliary electrode 220a are in the reading state, and $N_{13}$ is a natural number greater than 1. When the second auxiliary electrode 240a is in the reading state, voltage is at least not applied to the $N_{14}$ electrodes of the first electrodes 210 closest to the second area A2, the third auxiliary electrode 220b, and the first auxiliary electrode 220a; for example, the $N_{14}$ electrodes, the third auxiliary electrode 220b, and the first auxiliary electrode 220a are in the reading state, for example, and $N_{14}$ is a natural number greater than 2.

In an embodiment, when any one of the first electrodes 210 and the first auxiliary electrode 220a is in the reading state, voltage may be not applied to all of the electrodes at the second side S2. Similarly, when any one of the second electrodes 230 and the second auxiliary electrode 240a is in the reading state, voltage may be not applied to all of the electrodes at the first side S1.

Sixth Embodiment

Referring to FIG. 2, the control method of this embodiment is similar to the control method of the third embodiment, and the main difference therebetween is as follows. The control method of this embodiment is adapted to control the touch device 100' of FIG. 2. Sine the touch device 100' does not have the third auxiliary electrode 220b and the fourth auxiliary electrode 240b as shown in FIG. 1B, the control method of this embodiment needs not control the third auxiliary electrode 220b and the fourth auxiliary electrode 240b, and other steps of the control method are similar to those of the control method of the third embodiment.

It should be noted that in this embodiment, when the touched point is located between the first reference line L1 and the midline between the first electrodes 210d and 210e, and when the first auxiliary electrode 220a is in the reading state, there is no electrode above the first auxiliary electrode 220a to apply the first reference voltage, such that the above-mentioned edge modifying method of three point interpolation may be used to calculate the position of the touched point in the y-direction. By the same token, when the touched point is located between the second reference line L2 and the midline between the second electrodes 230d and 230e, and when the second auxiliary electrode 240a is in the reading state, the above-mentioned edge modifying method of three point interpolation may be used to calculate the position of the touched point in the y-direction.

Besides, when the touched point is located between the first reference line L1 and the eighth reference line L8 (i.e. the midline between the first electrode 210e and the first auxiliary electrode 220a and parallel to the first reference line L1), the edge modifying method of the two point interpolation is used to calculate the position of the touched point in the y-direction according to the voltage values read by the first electrode 210e and the first auxiliary electrode 220a, or the edge modifying method of the three point interpolation is used to calculate the position of the touched point in the y-direction according to the voltage values read by the second electrodes 230d and 230e and the second auxiliary electrode 240a. Based on the same principle, when the touched point is located between the second reference line L2 and the eighth reference line L8, the electrodes at the second side S2 may be used to reading the voltage values, and the edge modifying method of the two point interpolation is used to calculate the position of the touched point in the y-direction. Alternatively, the electrodes at the first side S1 may be used to reading the voltage values, and the edge modifying method of the three point interpolation is used to calculate the position of the touched point in the y-direction.

Seventh Embodiment

Referring to FIG. 2, the control method of this embodiment is similar to the control method of the sixth embodiment, and the main difference therebetween is as follows. For assuring the voltage environment when the electrode is in the reading state, in this embodiment, when the electrode at the first side S1 is in the reading state, voltage is also not applied to the opposite electrode and the obliquely opposite electrode at the second side S2. The detailed description is given as follows.

Voltage is at least not applied to the second auxiliary electrode 240a when one of the first electrodes 210 second closest to the second area A2 is in the reading state. Voltage is at least not applied to the second auxiliary electrode 240a and the one of the second electrodes 230 closest to the first area A1 when the one of the first electrodes 210 closest to the second area A2 is in the reading state. Voltage is at least not applied to the second auxiliary electrode 240a, the one of the second electrodes 230 closest to the first area A1, and the one of the second electrodes 230 second closest to the first area A1 when the first auxiliary electrode 220a is in the reading state. Voltage is at least not applied to the first auxiliary electrode 220a when the one of the second electrodes 230 second closest to the first area A1 is in the reading state. Voltage is at least not applied to the first auxiliary electrode 220a and the one of the first electrodes 210 closest to the second area A2 when the one of the second electrodes 230 closest to the first area A1 is in the reading state. Voltage is at least not applied to the first auxiliary electrode 220a, the one of the first electrodes 210 closest to the second area A2, and the one of the first electrodes 210 second closest to the second area A2 when the second auxiliary electrode 240a is in the reading state.

Eighth Embodiment

Referring to FIG. 2, the control method of this embodiment is similar to the control method of the seventh embodiment, and the main difference therebetween lies in that there are more obliquely opposite electrodes which are in the reading state, and the details are as follows.

When any one electrode selected from the electrodes of the first electrodes 210 which are second to $N_1$th closest to the second area A2 is in the reading state, voltage is at least not applied to the second auxiliary electrode 240a, and $N_1$ is a natural number greater than 2. Voltage is at least not applied to the second auxiliary electrode 240a and the $N_2$ electrodes of the second electrodes 230 closest to the first area A1 when the one of the first electrodes 210 closest to the second area A2 is in the reading state. When the first auxiliary electrode 220a is in the reading state, voltage is at least not applied to the $N_3$ electrodes of the second electrodes 230 closest to the first area A1, and $N_3$ is a natural number greater than 2. When any one electrode selected from the electrodes of the second electrodes 230 which are second to $N_4$th closest to the first area A1 is in the reading state, voltage is at least not applied to the first auxiliary electrode 220a, and $N_4$ is a natural number greater than 2. Voltage is at least not applied to the first auxiliary electrode 220a and the $N_5$ electrodes of the first electrodes 210 closest to the second area A2 when the one of the second electrodes 230 closest to the first area A1 is in the reading state, and $N_5$ is a natural number greater than 1. When the second auxiliary electrode 240a is in the reading state, voltage is at least not applied to the $N_6$ electrodes of the first electrodes 210 closest to the second area A2, and $N_6$ is a natural number greater than 2.

In an embodiment, when any one of the first electrodes 210 and the first auxiliary electrode 220a is in the reading state, voltage may be not applied to all of the electrodes at the second side S2. Similarly, when any one of the second electrodes 230 and the second auxiliary electrode 240a is in the reading state, voltage may be not applied to all of the electrodes at the first side S1.

In view of the above, in the embodiment of the disclosure, since the first electrodes and the second electrodes electrically connected to the first conductive film are respectively disposed at two opposite sides of the first conductive film, the problem of a single edge in the peripheral area of the conventional touch panel being too wide is effectively resulted. As a result, the touch device according to the embodiment of the disclosure has more beautiful appearance when it is disposed on a display, and has more applications. In addition, when the first electrodes and the first auxiliary electrode at the first side are controlled to be in the reading state one by one in turn, voltage is not applied to the suitable electrodes at the second side at a suitable time in the control method of this embodiment, such that the voltage environments of the electrodes at the first side in the reading state are more similar or consistent. As such, the accuracy of determining the position of the touched point of the touch device and the control method according to the embodiments of the disclosure is improved. Moreover, when the second electrodes and the second auxiliary electrode at the second side are controlled to be in the reading state one by one in turn, voltage is not applied to the suitable electrodes at the first side at a suitable time in the control method according to the embodiments of the disclosure, which also achieves the above-mentioned effect.

Although the disclosure has been described with reference to the above embodiments, it will be apparent to one of the ordinary skill in the art that modifications to the described embodiment may be made without departing from the spirit of the disclosure. Accordingly, the scope of the disclosure will be defined by the attached claims not by the above detailed descriptions.

What is claimed is:

1. A touch device, comprising:
  a first conductive film, having a first side, a second side opposite to the first side, a first area connecting the first side and the second side, and a second area connecting the first side and the second side, wherein the first area is adjacent to the second area;
  a plurality of first electrodes, separated from each other by one determined interval, disposed at a portion of the first side located at a side of the first area, and electrically connected to the first area;
  a first auxiliary electrode, disposed at another portion of the first side located at a side of the second area, and electrically connected to the second area, wherein the first auxiliary electrode is adjacent to the first electrodes and keeps distance from the first electrodes;
  a plurality of second electrodes, separated from each other by another determined interval, disposed at a portion of the second side located at another side of the second area, and electrically connected to the second area;
  a second auxiliary electrode, disposed at another portion of the second side located at another side of the first area, and electrically connected to the first area, wherein the second auxiliary electrode is adjacent to the second electrodes and keeps distance from the second electrodes; and
  a second conductive film, disposed beside the first conductive film, wherein the first conductive film keeps distance away from the second conductive film when the touch device is not pressed, and a pressed position of the first conductive film is in contact with the second conductive film when the touch device is pressed.

2. The touch device according to claim 1, further comprising a plurality of third electrodes, wherein the second conductive film has a third side, the third electrodes are disposed on the third side of the second conductive film and electrically connected to the second conductive film, an end of the third side is adjacent to an end of the first side, and the other end of the third side is adjacent to an end of the second side.

3. The touch device according to claim 2, wherein each of the first conductive film and the second conductive film has anisotropic impedance.

4. The touch device according to claim 3, wherein a main conductive direction of the first conductive film is substantially perpendicular to the first side and the second side, a main conductive direction of the second conductive film is substantially perpendicular to the third side, and the main conductive direction of the first conductive film is substantially perpendicular to the main conductive direction of the second conductive film.

5. The touch device according to claim 1, wherein one of the second electrodes closest to the first area and the first auxiliary electrode are arranged in a first reference line correspondingly, one of the first electrodes closest to the second area and the second auxiliary electrode are arranged in a second reference line correspondingly, the first reference line is substantially parallel to the second reference line, and the first reference line is substantially perpendicular to the first side and the second side.

6. The touch device according to claim 1, further comprising:
   at least one third auxiliary electrode, disposed at the portion of the first side located at the side of the second area, and electrically connected to the second area, wherein the third auxiliary electrode is adjacent to the first auxiliary electrode and keeps distance from the first auxiliary electrode, and the first auxiliary electrode is disposed between the third auxiliary electrode and the first electrodes; and
   at least one fourth auxiliary electrode, disposed at the portion of the second side located at the side of the first area, and electrically connected to the first area, wherein the fourth auxiliary electrode is adjacent to the second auxiliary electrode and keeps distance from the second auxiliary electrode, and the second auxiliary electrode is disposed between the fourth auxiliary electrode and the second electrodes.

7. The touch device according to claim 6, wherein one of the second electrodes closest to the first area and the first auxiliary electrode are arranged in a first reference line correspondingly, another one of the second electrodes second closest to the first area and the third auxiliary electrode are arranged in a third reference line correspondingly, one of the first electrodes closest to the second area and the second auxiliary electrode are arranged in a second reference line correspondingly, another one of the first electrodes second closest to the second area and the fourth auxiliary electrode are arranged in a fourth reference line correspondingly, the first reference line, the second reference line, the third reference line, and the fourth reference line are substantially parallel to one another, and the first reference line is substantially perpendicular to the first side and the second side.

8. A control method adapted to control the touch device according to claim 1, the control method comprising:
   controlling one of the first electrodes, the first auxiliary electrode, the second electrodes, and the second auxiliary electrode to be in a reading state one by one in turn, and applying a first reference voltage to at least a part of the others of the first electrodes, the first auxiliary electrode, the second electrodes, and the second auxiliary electrode, and applying a second reference voltage to the second conductive film;
   at least not applying voltage to the second auxiliary electrode when one of the first electrodes closest to the second area is in the reading state;
   at least not applying voltage to one of the second electrodes closest to the first area when the first auxiliary electrode is in the reading state;
   at least not applying voltage to the first auxiliary electrode when the one of the second electrodes closest to the first area is in the reading state; and
   at least not applying voltage to the one of the first electrodes closest to the second area when the second auxiliary electrode is in the reading state.

9. The control method according to claim 8, further comprising:
   at least not applying voltage to the second auxiliary electrode when another one of the first electrodes second closest to the second area is in the reading state;
   at least not applying voltage to the second auxiliary electrode and the one of the second electrodes closest to the first area when the one of the first electrodes closest to the second area is in the reading state;
   at least not applying voltage to the second auxiliary electrode, the one of the second electrodes closest to the first area, and another one of the second electrodes second closest to the first area when the first auxiliary electrode is in the reading state;
   at least not applying voltage to the first auxiliary electrode when the one of the second electrodes second closest to the first area is in the reading state;
   at least not applying voltage to the first auxiliary electrode and the one of the first electrodes closest to the second area when the one of the second electrodes closest to the first area is in the reading state; and
   at least not applying voltage to the first auxiliary electrode, the one of the first electrodes closest to the second area, and the one of the first electrodes second closest to the second area when the second auxiliary electrode is in the reading state.

10. The control method according to claim 8, wherein the touch device further comprises:
    at least one third auxiliary electrode, disposed at the portion of the first side located at the side of the second area, and electrically connected to the second area, wherein the third auxiliary electrode is adjacent to the first auxiliary electrode and keeps distance from the first auxiliary electrode, and the first auxiliary electrode is disposed between the third auxiliary electrode and the first electrodes; and
    at least one fourth auxiliary electrode, disposed at the portion of the second side located at the side of the first area, and electrically connected to the first area, wherein the fourth auxiliary electrode is adjacent to the second auxiliary electrode and keeps distance from the second auxiliary electrode, and the second auxiliary electrode is disposed between the fourth auxiliary electrode and the second electrodes, and
    the driving method further comprising:
    at least not applying voltage to the fourth auxiliary electrode when another one of the first electrodes second closest to the second area is in the reading state;
    at least not applying voltage to the third auxiliary electrode when another one of the second electrodes second closest to the first area is in the reading state.

11. The control method according to claim 10, further comprising:
    applying the first reference voltage to the third auxiliary electrode when the first auxiliary electrode is in the reading state; and applying the first reference voltage to the fourth auxiliary electrode when the second auxiliary electrode is in the reading state.

12. The control method according to claim 10, further comprising:

at least not applying voltage to the fourth auxiliary electrode when yet another one of the first electrodes third closest to the second area is in the reading state;

at least not applying voltage to the fourth auxiliary electrode and the second auxiliary electrode when the one of the first electrodes second closest to the second area is in the reading state;

at least not applying voltage to the one of the second electrodes closest to the first area, the fourth auxiliary electrode, and the second auxiliary electrode when the one of the first electrodes closest to the second area is in the reading state;

at least not applying voltage to the third auxiliary electrode when yet another one of the second electrodes third closest to the first area is in the reading state;

at least not applying voltage to the third auxiliary electrode and the first auxiliary electrode when the one of the second electrodes second closest to the first area is in the reading state; and at least not applying voltage to the one of the first electrodes closest to the second area, the third auxiliary electrode, and the first auxiliary electrode when the one of the second electrodes closest to the first area is in the reading state.

* * * * *